Dec. 18, 1923.

V. R. CARTER 1,477,628

TRANSMISSION

Filed Nov. 18, 1921   2 Sheets-Sheet 1

Inventor.
Van Roy Carter.
by Hazard and Miller

Dec. 18, 1923.  1,477,628
V. R. CARTER
TRANSMISSION
Filed Nov. 18, 1921  2 Sheets-Sheet 2

Inventor:
Van Roy Carter
by Hazard and Miller
Attys.

Patented Dec. 18, 1923.

1,477,628

UNITED STATES PATENT OFFICE.

VAN ROY CARTER, OF LOS ANGELES, CALIFORNIA.

TRANSMISSION.

Application filed November 18, 1921. Serial No. 516,077.

*To all whom it may concern:*

Be it known that I, VAN ROY CARTER, a citizen of the United States, residing at Los Angeles, in the county of Los Angeles and State of California, have invented new and useful Improvements in Transmissions, of which the following is a specification.

My invention relates to variable speed transmissions more particularly adapted, although not necessarily, to the driving mechanism of motor vehicles.

A purpose of my invention is the provision of a transmission which utilizes a liquid to effect an operative connection between a driving element and a driven element, and in such manner that the speed with which the driven element is rotated can be varied as desired.

In carrying out my invention, I provide a transmission embodying pistons movable in cylinders for operatively connecting a driving shaft to a driven shaft, with the cylinders rotatable in an oil filled casing and the passage of oil into and out of the cylinders being controlled by a manually operable valve whereby the resistance offered by the oil to the pistons can be varied to increase or decrease the speed with which the driven shaft is rotated.

I will describe one form of transmission embodying my invention, and will then point out the novel features thereof in claims.

In the accompanying drawings.

Similar reference characters refer to similar parts in each of the several views.

Figure 1:
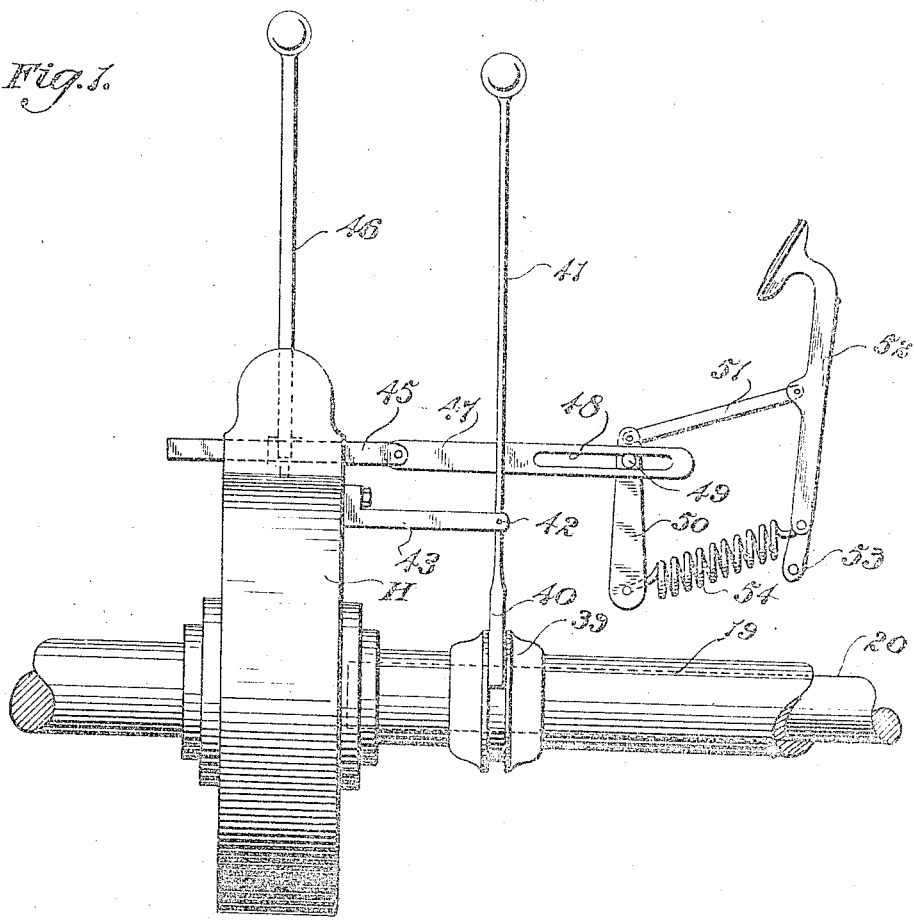
Figure 1 is a view showing in side elevation one form of transmission embodying my invention.

Referring specifically to the drawings, my invention, in its present embodiment, comprises a housing H of annular form having axial openings at the opposite sides thereof bordered by flanges 15 and 16 for receiving rings 17 constructed to provide raceways for ball bearings 18. Extending into the openings of the housing is a sleeve 19 which slidably receives a driving shaft 20 which is rotatable therewith through medium of a key 21 slidably fitted in a suitable groove formed in the shaft 20. At the opposite side a driven shaft 22 extends into the housing, this shaft being adapted for connection to the rear axle of a motor vehicle while the shaft 20 constitutes an extension of the crank shaft of the motor. It will be understood that the ball bearings 18 are designed for rotatably supporting the confronting ends of a sleeve shaft 19 and the driven shaft 22 within the housing H.

Figure 2:
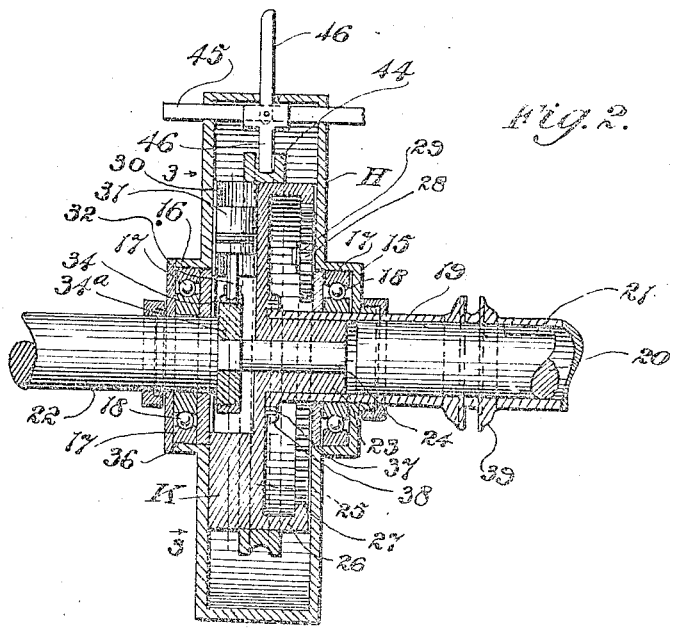
Fig. 2 is a sectional view of the transmission shown in Fig. 1, with certain parts thereof broken away.

As illustrated to advantage in Fig. 2, a casing K is mounted within the housing for rotational movement upon the sleeve 19 through the medium of a hub portion 23 which is bored to receive a reduced extension 24 of the shaft 22. The hub portion 23 extends axially from one side of a central partition 25, this partition being formed with an annular flange having an annular flange 26' provided with an internal ring gear 27 which is arranged to mesh with a toothed gear 28, the latter constituting a reversing gear and being rotatably mounted upon a stub shaft 29 supported within the housing. At the opposite side of the partition 25, the casing is formed with a plurality of cylinders 30 each of which slidably receives a piston 31. In the present instance I have shown only three cylinders and a corresponding number of pistons, but it is to be understood that various numbers of cylinders and pistons can be used.

The piston rods 32 of the pistons 31 are pivotally connected to the pistons at one end and connected to extensions 33 formed on a ring 34, the latter being rotatably mounted on a cam 34ᵃ formed on the shaft 22. As illustrated to advantage in Fig. 3, two of the piston rods are pivotally connected to the corresponding extensions 33, while the third rod is rigidly connected to the extension 33, as indicated at 35. The cam 34ᵃ is eccentrically positioned on the shaft 22 so that it will be evident that upon rotation of the casing K, reciprocating movement of the pistons within the cylinders is effected through the medium of the ring 34.

As shown in Fig. 2, that end of the sleeve shaft 19 extending into the casing K is provided with an external ring gear 37 which is adapted to mesh with internal ring gear 38 formed integrally with or fixed to the partition 25. As previously described, the sleeve shaft 19 is movable longitudinally on the driving shaft 20, and by virtue of this movement it is possible to shift the shaft so as to cause the gear 37 to engage either the gear 38 or the gear 28. The gear 38 constitutes the forward gear or that gear which effects a forward movement of the motor vehicle. To effect this movement of the shaft 19, a groove collar 39 is formed on the shaft and is adapted to be engaged by a fork 40 formed on the lower end of a gear shifting lever 41 fulcrumed at the point 42 on an arm 43 bolted to the housing H.

Figure 3:
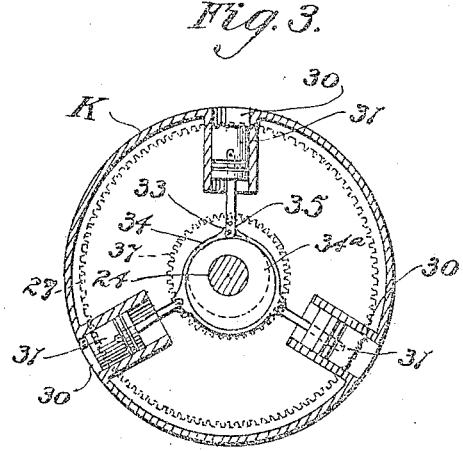
Fig. 3 is a vertical sectional view taken on the line 3—3 of Fig. 2.
Figure 4:
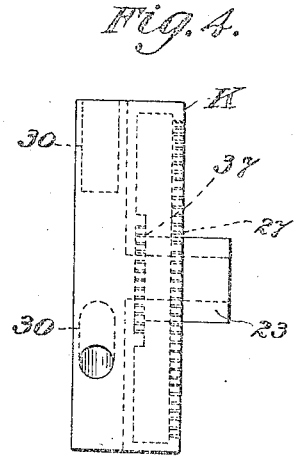
Fig. 4 is a detail view showing in side elevation the casing comprised in the transmission shown in the preceding views.

As clearly shown in Figs. 3 and 4, the outer ends of the cylinder 30 are open for the purpose of admitting a fluid, such as oil, or the like, into the cylinders to oppose the reciprocating movement of the pistons 31. The housing H is adapted to be filled with oil or any other suitable fluid, the passage of oil into and out of the cylinders being controlled by a sleeve valve 44, which as shown in Fig. 2 encompasses the housing so that it is capable of simultaneously opening or closing all of the cylinders. As valve 44 is slidably mounted upon the casing K and is adapted to be manually moved to open or close the cylinders by the mechanism shown in Fig. 1 which, in the present instance, comprises a bar 45 slidable through the housing H having an extension 46 engaging in an annular groove formed in the valve 44. Connected to the bar 45 is an operating lever 46 which because of its function is termed a speed control lever. At the forward end of the bar 45 a link 47 is connected, this link being formed with a slot 48 which is adapted to work a pin 49 carried by an arm 50 which is pivotally connected at its upper end to a link 51. The forward end of the link 51 is pivotally connected to a foot pedal 52 mounted to swing about an axle 53 and connected to the lower end of the arm 50 to a coiled contractile spring 54.

From the foregoing construction it will be seen that actuation of the valve 44 can be effected through movement of the speed control lever 46 of the pedal 52, the latter being designed for moving the valve to open position or to such a position wherein the outer ends of the cylinders are fully exposed. The spring 54 functions to normally maintain the pedal in the vertical position shown in Fig. 1, so that by forward movement of the upper end of the pedal effects a forward movement of the pin 49, so that when the latter engages the end of the slot 48, the members 45—47 will be advanced to move the valve to open position.

The operation of the transmission is as follows:

With rotation of the driving shaft 20, the sleeve shaft 19 is likewise rotated, and when the sleeve is in the position shown in Fig. 2, rotation of the casing K is effected through the medium of the intermeshing gears 37 and 38. With the casing K rotating, it will be clear that the cylinders 30 describe a circular path, and under the action of the cam 34$^a$, the pistons 31 are caused to be reciprocated within the cylinders. When the valve 44 is in closed position so that the outer ends of the cylinders are completely closed, the oil trapped within the cylinders resists the reciprocating movement of the latter so that motion is imparted to the shaft 22 from the shaft 20. However, when the valve 44 is moved to open or partially open position, the oil is allowed to circulate into and out of the cylinders thus allowing of the reciprocating movement of the pistons. It will be understood that when the valve is in fully open position the resistance offered by the oil is practically nil, so that the pistons are free to move within the cylinders thereby imparting no movement to the shaft 22.

In this operation it will be clear that with the valve 44 in completely open position no motion is imparted to the driven shaft 22, but that as the valve is moved to closed position an operative connection is established between the driving shaft 20 and the driven shaft 22, the rotational speed of the latter increasing until it reaches the maximum or the same speed as the shaft 20 when the valve is in completely closed position. It will thus be seen that any rotational speed may be imparted to the driven shaft 22 depending upon the position of the valve 44, so that after the gear 37 is in mesh with the gear 38 the forward movement of the vehicle can be controlled through the medium of the valve.

When it is desired to reverse the rotation of the shaft 22 in effecting a rearward movement of the vehicle, the sleeve shaft 19 is moved forwardly by the manipulation of the lever 41 until the gear 37 meshes with the gear 28 thereby effecting a reverse rotation of the casing K. In this position of the gear 37 it will be clear that the valve 44 can again be operated to control the rotational speed of the shaft 22 in the reverse direction. By moving the gear 37 to neutral position wherein it is out of mesh with the gears 38—28, the driven shaft 22 is completely disconnected from the driving shaft 20.

Although I have herein shown and described only one form of transmission embodying my invention, it is to be understood that various changes and modifications may be made herein without departing from the spirit of the invention and the spirit and scope of the appended claims.

What I claim is:

1. A transmission comprising driving and driven shafts, a housing adapted to contain a fluid, a casing rotatable within the housing, movable members operatively connecting said casing with the driven shaft, said members being movable in the casing to effect a circulation of the fluid in the housing through the casing, and a cut-off common to all of said members for controlling the circulation of fluid into and out of the casing whereby the rotational speed of the driven shaft is varied.

2. A transmission comprising driving and driven shafts, a housing adapted to contain a fluid, a casing rotatable within the housing, cylinders carried by the casing and having open outer ends, pistons movable within the cylinders, means on the driven shaft for reciprocating the pistons when the casing is rotated, and a sleeve valve slidable on the casing for controlling the open ends of all of said cylinders for the purpose described.

3. A transmission comprising driving and driven shafts, a housing, a casing rotatable within the housing, gears carried by the casing, a gear mounted on the housing and engageable with one of the first mentioned gears, a gear movably mounted on the driving shaft and rotatable therewith to engage one of the casing gears or the second mentioned gear, members carried by the casing and adapted to be moved upon rotation of the casing for effecting the circulation of a fluid through the casing, and manually operable means for controlling the circulation of fluid through said casing.

4. A transmission comprising driving and driven shafts arranged in alinement, a housing receiving the confronting ends of the shafts, a sleeve shaft slidable on the driving shaft and rotatable therewith, a casing rotatably mounted on the sleeve shaft, gears carried by the casing, a gear mounted in the housing and engageable with one of the gears, a gear carried by the sleeve shaft and adapted to engage one of the casing gears and a second mentioned gear, cylinders formed in the casing and arranged radially of the axis thereof, a cam eccentrically mounted on the driven shaft, pistons movable within said cylinders and operatively connected to said cam, and a sleeve valve surrounding the casing and movable to open or close the ends of said cylinders.

5. A transmission comprising driving and driven shafts arranged in alinement, a housing receiving the confronting ends of the shafts, a sleeve shaft slidable on the driving shaft and rotatable therewith, a casing rotatably mounted on the sleeve shaft, gears carried by the casing, a gear mounted in the housing and engageable with one of the gears, a gear carried by the sleeve shaft and adapted to engage one of the casing gears and a second mentioned gear, cylinders formed in the casing and aranged radially of the axis thereof, a cam eccentrically mounted on the driven shaft, pistons movable within said cylinders and operatively connected to said cams, a sleeve valve surrounding the casing and movable to open or close the ends of said cylinders, and means for moving said valve including a pedal urged to one position and adapted to be moved to another position for moving said valve to open position.

In testimony whereof I have signed my name to this specification.

VAN ROY CARTER.